(12) United States Patent
Lin

(10) Patent No.: US 6,533,309 B2
(45) Date of Patent: Mar. 18, 2003

(54) TRICYCLE STROLLER FRAME

(76) Inventor: Wan-Hsin Lin, 58, Ma Yuan West St., Taichung (TW)

( * ) Notice: Subject to any disclaimer, the term of this patent is extended or adjusted under 35 U.S.C. 154(b) by 0 days.

(21) Appl. No.: 09/881,170

(22) Filed: Jun. 12, 2001

(65) Prior Publication Data

US 2002/0185843 A1 Dec. 12, 2002

(51) Int. Cl.$^7$ ................................................ B62B 1/00
(52) U.S. Cl. ........................ 280/642; 280/62; 403/109.8
(58) Field of Search ................................. 280/642, 643, 280/647, 648, 650, 657, 658, 47.38, 47.4, 47.27, 655, 655.1, 639, 62; D12/129; 403/109.1, 109.2, 377, 379.1, 379.5, 379.6, 109.5, 109.6, 109.7, 109.8; D34/12, 18

(56) References Cited

U.S. PATENT DOCUMENTS

| | | | | |
|---|---|---|---|---|
| 3,998,476 A | * | 12/1976 | Kazamark, Sr. | ............ 280/655 |
| D370,194 S | * | 5/1996 | Baechler et al. | ........... D12/129 |
| 5,558,357 A | * | 9/1996 | Wang | ........................ 280/647 |
| 6,053,525 A | * | 4/2000 | Lin | ............................. 280/642 |
| 6,193,263 B1 | * | 2/2001 | Lin | ............................. 280/643 |
| D452,194 S | * | 12/2001 | Stohr et al. | ................ D12/129 |
| D452,197 S | * | 12/2001 | Martin et al. | .............. D12/133 |

OTHER PUBLICATIONS

U.S. patent application Publication 2002/0070531—Jun. 13, 2002.*
U.S. patent application Publication 2002/0050700—dated May 2,2002.*

* cited by examiner

Primary Examiner—Brian L. Johnson
Assistant Examiner—Bryan Fischmann

(57) ABSTRACT

A tricycle stroller frame has a shaft pipe and a base frame. The base frame has two connectors to receive the shaft pipe, two tubes connected to the connectors, a movable seat, a positioning seat, and an H-shaped frame. Each tube has a front threaded aperture. The movable seat has two male blocks, two first through apertures to receive the tubes, two second through apertures to receive the H-shape frame, and two round threaded holes. The positioning seat has two female blocks to match the male blocks, two first through holes to receive the tubes, two second through holes to receive the H-shape frame, and two circular threaded holes.

1 Claim, 6 Drawing Sheets

TRICYCLE STROLLER FRAME

BACKGROUND OF THE INVENTION

The present invention relates to a tricycle (three-wheeled) stroller frame. More particularly, the present invention relates to a tricycle stroller frame which has a base frame to be retracted while the tricycle stroller frame is folded.

Referring to FIG. 1, a conventional tricycle stroller frame has a front frame 1', a handle push pipe 2', a rear frame 3', a shaft pipe 4', and a base frame 5'. Two joints 6' are connected to the front frame 1', the handle push pipe 2', and the rear frame 3'. When the conventional tricycle stroller frame is folded, the base frame 5' becomes too long.

SUMMARY OF THE INVENTION

An object of the present invention is to provide a tricycle stroller frame which has a base frame which can retract when the tricycle stroller frame is folded.

Accordingly, a tricycle stroller frame comprises a shaft pipe and a base frame. The base frame has two connectors to receive the shaft pipe, two tubes connected to the connectors, a movable seat, a positioning seat, and an H-shaped frame. Each of the tubes has a front threaded aperture. The movable seat has two male blocks, two first through apertures to receive the tubes, two second through apertures to receive the H-shaped frame, and two round threaded holes. The positioning seat has two female blocks to match the male blocks, two first through holes to receive the tubes, two second through holes to receive the H-shaped frame, and two circular threaded holes. The H-shaped frame has two front end forks and two rear threaded apertures. Two bolts fasten the positioning seat and the tubes together through the circular threaded holes of the positioning seat and the front threaded apertures of the tubes. Two screws fasten the movable seat and the H-shaped frame together through the round threaded holes of the movable seat and the rear threaded apertures of the H-shaped frame.

DETAILED DESCRIPTION OF THE INVENTION

Figure 1:
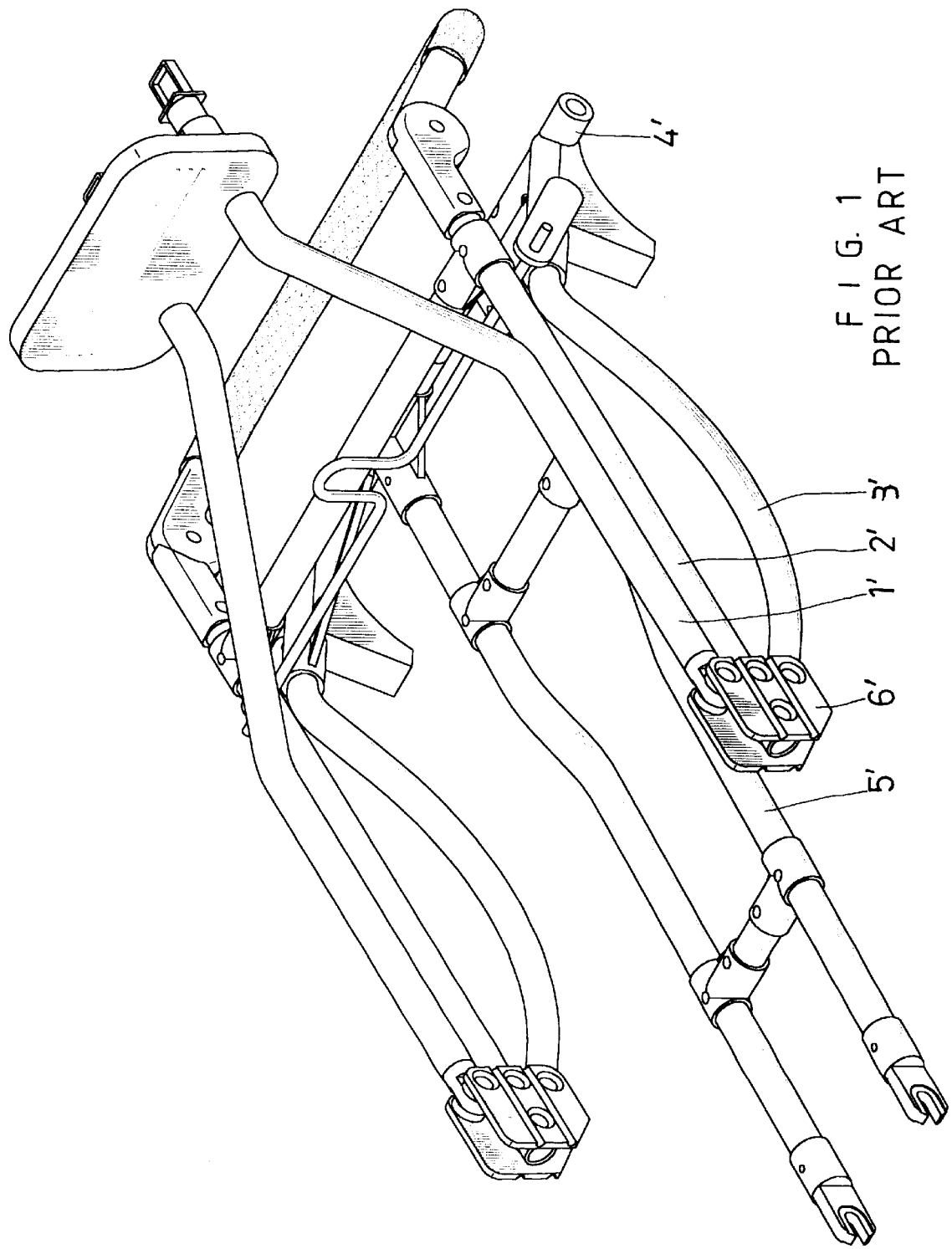
FIG. 1 is a perspective view of a tricycle stroller frame of the prior art.

Referring to FIGS. 2 to 6, a tricycle stroller frame comprises a front frame 1, a handle push pipe 2, a rear frame 3, a shaft pipe 4, and a base frame 9. Two joints 5 are connected to the front frame 1, the handle push pipe 2, and the rear frame 3.

The base frame 9 has two connectors 942 to receive the shaft pipe 4, two tubes 94 connected to the connectors 942, a movable seat 93, a positioning seat 92, and an H-shaped frame 91.

Each of the tubes 94 has a front threaded aperture 941.

The movable seat 93 has two male blocks 935, two first through apertures 931 to receive the tubes 94, two second through apertures 932 to receive the H-shaped frame 91, and two round threaded holes 933.

The positioning seat 92 has two female blocks 925 to match the male blocks 935, two first through holes 921 to receive the tubes 94, two second through holes 922 to receive the H-shaped frame 91, and two circular threaded holes 923.

The H-shaped frame 91 has two front end forks 911 and two rear threaded apertures 912.

Two bolts 924 fasten the positioning seat 92 and the tubes 94 together through the circular threaded holes 923 of the positioning seat 92 and the front threaded apertures 941 of the tubes 94.

Two screws 934 fasten the movable seat 93 and the H-shaped frame 91 together through the round threaded holes 933 of the movable seat 93 and the rear threaded apertures 912 of the H-shaped frame 91.

Figure 5:
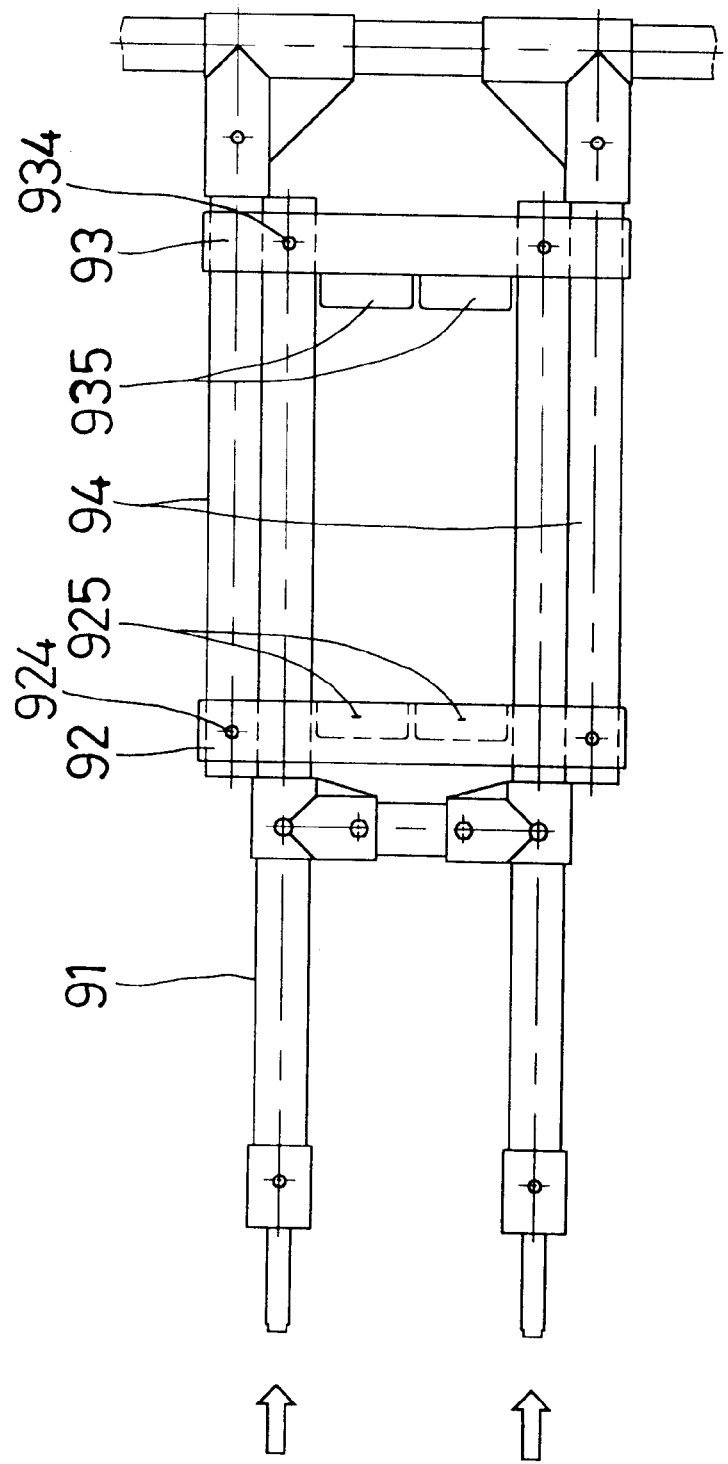
FIG. 5 is a schematic view illustrating a base frame of a preferred embodiment is retracted.
Figure 6:
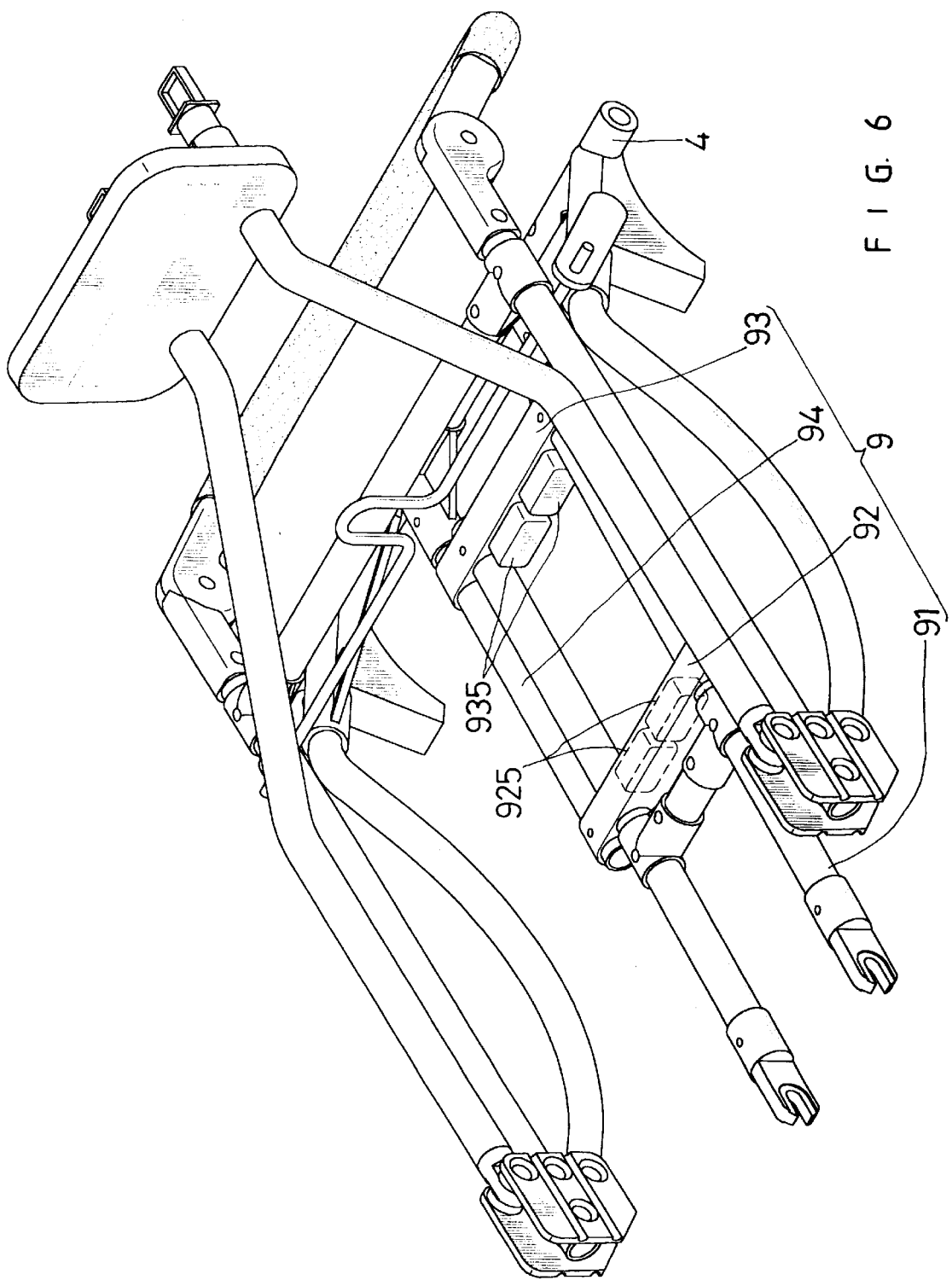
FIG. 6 is a perspective view of a base frame of a preferred embodiment while the base frame is retracted.

Referring to FIGS. 5 and 6, the H-shaped frame 91 is retracted until the movable seat 93 reaches the connectors 942.

Figure 2:
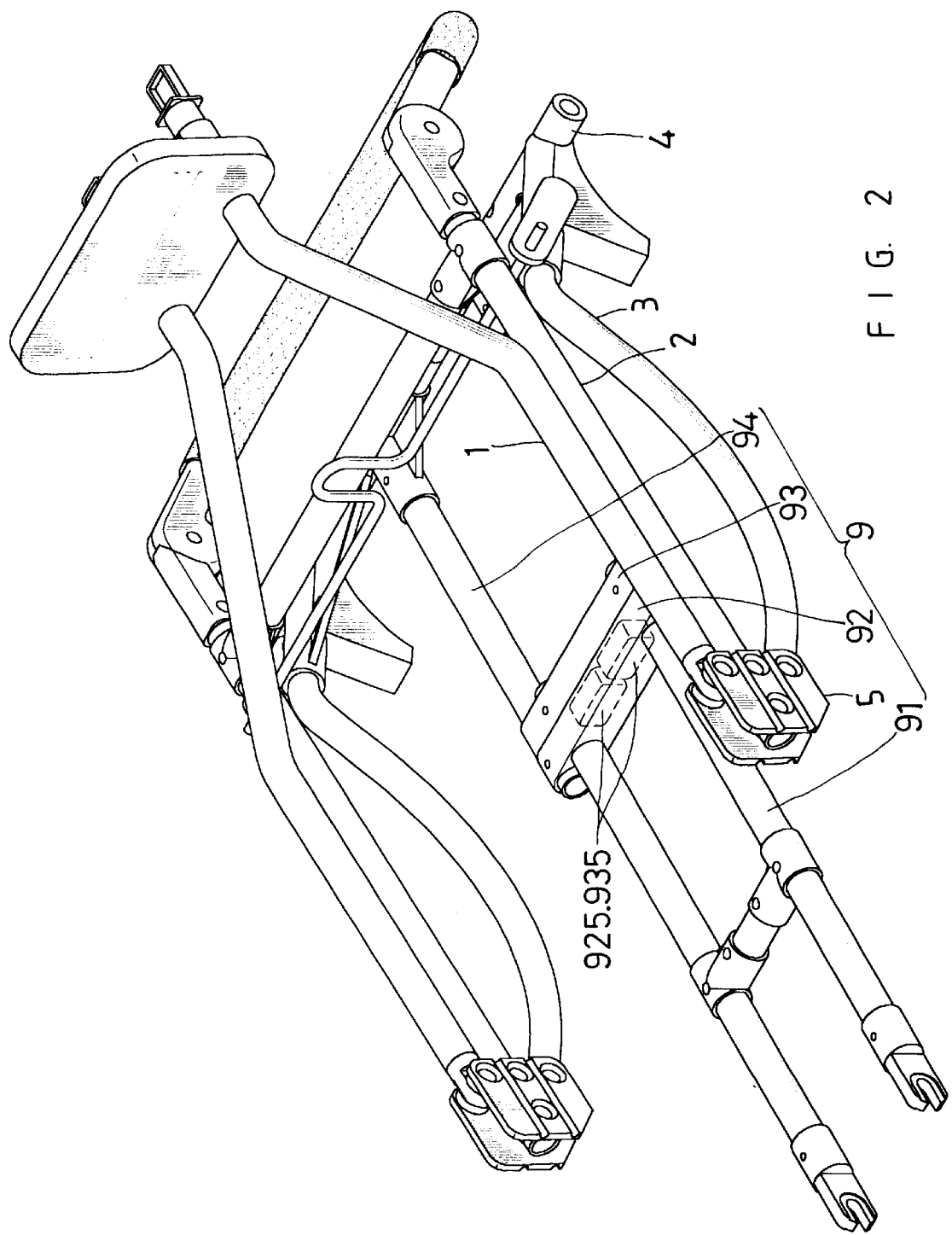
FIG. 2 is a perspective view of a tricycle stroller frame of a preferred embodiment in accordance with the present invention.
Figure 3:
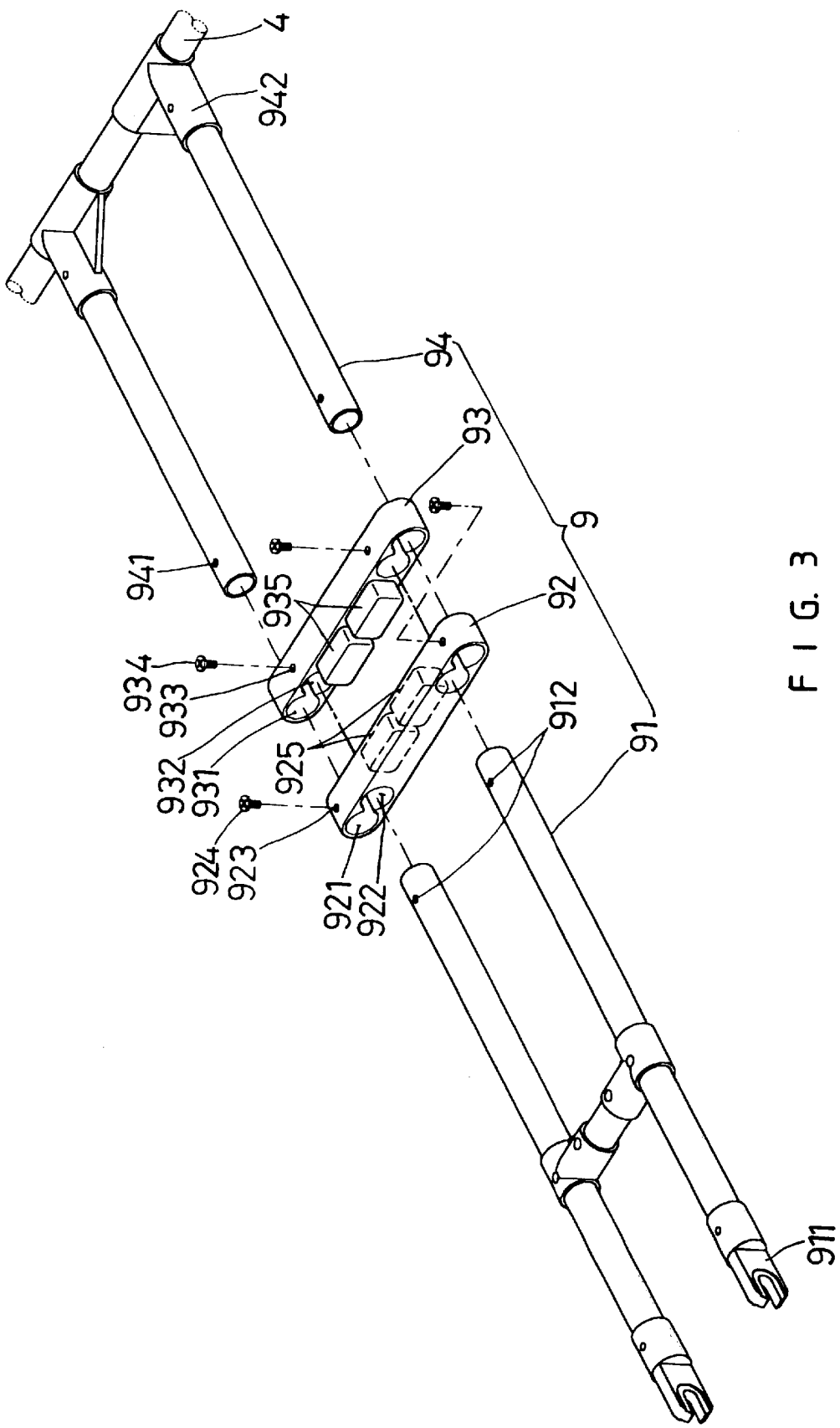
FIG. 3 is a perspective view of a base frame of a preferred embodiment in accordance with the present invention.
Figure 4:
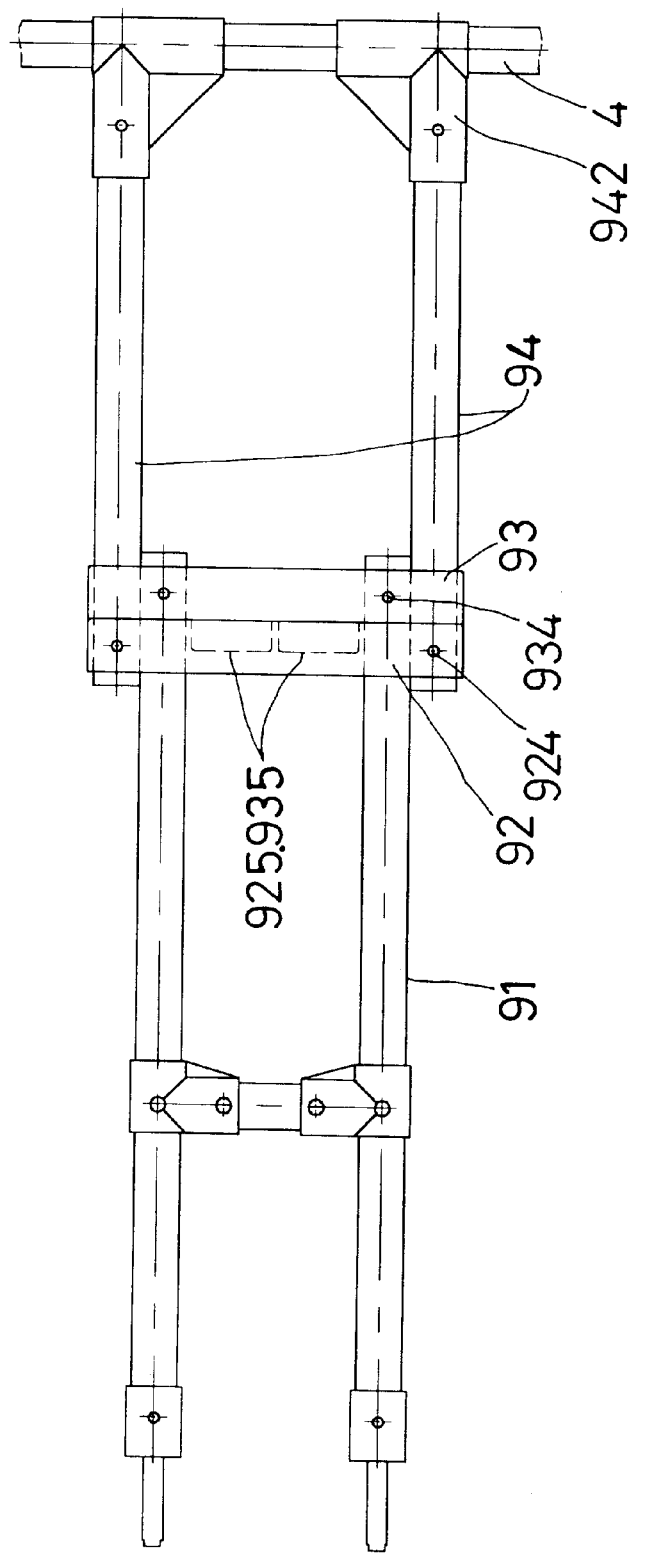
FIG. 4 is a schematic view illustrating a base frame of a preferred embodiment is extended.

Referring to FIGS. 2 and 4, the H-shaped frame 91 is extended until the female blocks 925 engage with the male blocks 935.

The invention is not limited to the above embodiment but various modification thereof may be made. Further, various changes in form and detail may be made without departing from the scope of the invention.

I claim:

1. A tricycle stroller frame comprising:

a shaft pipe and a base frame, the base frame having two connectors to receive the shaft pipe, two tubes connected to the connectors, a movable seat, a positioning seat, and an H-shaped frame, each of the tubes having a front threaded aperture, the movable seat having two male blocks, two first through apertures to receive the tubes, two second through apertures to receive the H-shaped frame, and two round threaded holes, the positioning seat having two female blocks to match the male blocks, two first through holes to receive the tubes, two second through holes to receive the H-shaped frame, and two circular threaded holes, the H-shaped frame having two front end forks and two rear threaded apertures, two bolts fastening the positioning seat and the tubes together through the circular threaded holes of the positioning seat and the front threaded apertures of the tubes, and two screws fastening the movable seat and the H-shaped frame together through the round threaded holes of the movable seat and the rear threaded apertures of the H-shaped frame.

* * * * *